(12) United States Patent
Meyerbröker et al.

(10) Patent No.: US 11,666,866 B2
(45) Date of Patent: Jun. 6, 2023

(54) CARBON NANOMEMBRANES ON POROUS MATERIALS

(71) Applicant: CNM Technologies GmbH, Bielefeld (DE)

(72) Inventors: Nikolaus Meyerbröker, Bielefeld (DE); Polina Angelova, Bielefeld (DE); Albert Schnieders, Bielefeld (DE); Henning Vieker, Espelkamp (DE)

(73) Assignee: CNM Technologies GmbH, Bielefeld (DE)

( * ) Notice: Subject to any disclaimer, the term of this patent is extended or adjusted under 35 U.S.C. 154(b) by 63 days.

(21) Appl. No.: 17/056,575

(22) PCT Filed: May 27, 2019

(86) PCT No.: PCT/EP2019/063603
§ 371 (c)(1),
(2) Date: Nov. 18, 2020

(87) PCT Pub. No.: WO2019/228956
PCT Pub. Date: Dec. 5, 2019

(65) Prior Publication Data
US 2021/0205763 A1    Jul. 8, 2021

(30) Foreign Application Priority Data
May 29, 2018   (LU) ........................................ 100812

(51) Int. Cl.
*B01D 71/02*      (2006.01)
*B01D 61/00*      (2006.01)
(Continued)

(52) U.S. Cl.
CPC ......... *B01D 71/021* (2013.01); *B01D 61/002* (2013.01); *B01D 67/006* (2013.01);
(Continued)

(58) Field of Classification Search
CPC ................ B01D 71/021; B01D 61/002; B01D 67/0032; B01D 67/006; B01D 67/0067;
(Continued)

(56) References Cited

U.S. PATENT DOCUMENTS 6,764,758 B1    7/2004  Eck et al.
9,505,192 B2   11/2016  Bedworth et al.

FOREIGN PATENT DOCUMENTS

CN    103895278 A    7/2014
EP      2032501 A2    3/2009
(Continued)

OTHER PUBLICATIONS

Trautmann, et al., "Etching threshold for ion tracks in polyimide", Nuclear Instruments and Methods in Physics Research B 116 (1996) 429-433.
(Continued)

*Primary Examiner* — Krishnan S Menon
(74) *Attorney, Agent, or Firm* — 24IP Law Group USA, PLLC; Timothy DeWitt

(57) ABSTRACT

A method for manufacturing a porous device (10) is described. The method comprises creating (340) a carbon nanomembrane (40) on a top surface (22) of a base material (20) having latent pores (23) and etching (360) the latent pores (23) in the base material (20) to form open pores (24). The porous device (10) can be used as a filtration device.

8 Claims, 8 Drawing Sheets

(51) Int. Cl.
 *B01D 67/00* (2006.01)
 *B01D 69/10* (2006.01)

(52) U.S. Cl.
 CPC ..... *B01D 67/0032* (2013.01); *B01D 67/0067* (2013.01); *B01D 67/0072* (2013.01); *B01D 67/0079* (2013.01); *B01D 69/105* (2013.01); *B01D 2323/28* (2013.01); *B01D 2323/30* (2013.01); *B01D 2323/34* (2013.01)

(58) Field of Classification Search
 CPC ............ B01D 67/0072; B01D 67/0079; B01D 69/105; B01D 2323/28; B01D 2323/30; B01D 2323/34; B01D 69/12; B01D 69/125; B01D 67/0023
 See application file for complete search history.

(56) References Cited

FOREIGN PATENT DOCUMENTS

| | | | |
|---|---|---|---|
| EP | 2144711 | A2 | 1/2010 |
| JP | H0360713 | A | 3/1991 |
| WO | 2007/147643 | A2 | 12/2007 |
| WO | 2017/072272 | A1 | 5/2017 |

OTHER PUBLICATIONS

Radiation Use in Producing_Track_Etched_Membranesy, Chapter 18, Sun and A_ G_ Chmielewski, Institute of Nuclear Chemistry and Technology, Warszawa 2017.
Turchanin and Goelzhaeuser, "Carbon Nanomembranes", Adv. Mater., 28 (2016) 6075-6013.
Lukas Madauß, et al, "Fabrication of nanoporous graphene/polymer composite membranes", Nanoscale 9, 10487 (2017).
Kemal Celebi, et al, "Ultimate Permeation Across Atomically Thin Porous Graphene", Science vol. 344, p. 289 (2014).
Yang, et al, "Rapid Water Permeation Through Carbon Nanomembranes with Sub-Nanometer Channels", ACS Nano 12, 4695-4701 (2018).
Apel, "Track etching technique in membrane technology", Radiation Measurements vol. 34, 559-566 (2001).
Organessian, et al., Nuclear Instruments and Methods in Physics Research B208, 166 (2003).
Zan, et al., "Graphene Reknits Its Holes" Nano Letters 12, 3936 (2012).
Zakharchenko et al., "Controlled healing of graphene nanopores" Carbon vol. 80, 12-18 (2014).
S.C. O'Hern et al., "Nanofiltration across Defect-Sealed Nanoporous Monolayer Graphene", Nano Letters 15, 3524 (2015).
Beyer, et al., "Fabrication of metal patterns on freestanding graphenoid nanomembranes", J. Vac. Sci. Technol. B 28 C6D5, Nov./Dec. 2010, chapter III.A.
Eck, et al., "Freestanding Nanosheets from Crosslinked Biphenyl Self-Assembled Monolayers", Adv. Mater. 2005, 17, 2583-2587.
Sartowska, et al., "Nanopores with controlled profiles in track-etched membranes", NUKLEONIKA 2012;57(4):575-579.

CARBON NANOMEMBRANES ON POROUS MATERIALS

FIELD OF THE INVENTION

The invention relates to a method of manufacturing a carbon nanomembrane (CNM) on a porous base material to form a porous device.

BACKGROUND OF THE INVENTION

Carbon nanomembranes (CNMs) are two-dimensional (2D) carbon-based materials produced from radiation-induced crosslinking of a layer of precursor molecules with an aromatic molecular backbone. The CNMs based on self-assembled monolayers (SAMs) are disclosed, for example, in U.S. Pat. No. 6,764,758 B1 and by Turchanin and Golzhauser (Adv. Mater., 28 (2016) 6075). Despite their thicknesses of only 0.3 to 30 nm, the CNMs are found to be exceptionally mechanically, chemically and thermally stable. It is known that the CNMs have an intrinsic porosity and can be used for filtration/separation applications. These unique properties are derived from their high degree of lateral cross-linking since the properties are not observed on non-cross-linked layers of precursor molecules.

The preparation of carbon nanomembranes (CNMs) requires a continuous, flat, chemically homogeneous and often stiff substrate on which the carbon nanomembranes are formed. The CNMs for applications in gas and fluid filtration/separation applications require a mechanically stable and porous or permeable supporting layer used as a support for the CNMs, because at least some of the molecules in the gas or fluid need to pass through the supporting layer.

PRIOR ART

Membranes with sub-nanometre (nano-sized) pores are highly interesting, because the membranes are able to mimic biological membranes and offer huge potential in applications like water filtration, molecular separation and desalination.

Two-dimensional nanomaterials (termed "nanomembranes") like graphene, graphene oxide or carbon nanomembranes (CNMs) are used as materials for high-performances gas and water separation tasks. These nanomaterials however have to be prepared on continuous, flat, chemically homogeneous and often stiff substrates and these substrates are impermeable for gases and liquids. Hence, the two-dimensional nanomaterials need to be transferred to a porous support after manufacture. This transfer step suffers from the fact that it is extremely difficult to transfer nanometre-thin membranes without causing defects. It has also been found that the transfer process is highly undesirable when being used in scaled up mass production.

Graphene as a material is in intense focus of current research. It is aggravating that graphene is actually impermeable because the material has no intrinsic pores, i.e. pores which are not deliberately introduced into the material by external means, but are a property of the material itself. Hence another step is necessary to create the necessary pores into the graphene material by e.g. heavy ion bombardment (as e.g. disclosed by Madauß et al., Nanoscale 9, 10487 (2017); Stoltenberg et al., U.S. Pat. No. 9,505,192 B2; CN 103895278 B) or focused ion beams (Celebi et al., Science 344, 289 (2014)).

From this point of view, the carbon nanomembranes (CNMs) exhibit two unique advantages. The CNMs are ultra-thin and have intrinsic pores in the desired sub-nanometre range making the CNMs highly permeable to water but impermeable for almost all other materials, including materials with similar kinetic diameters (see Yang et al., ACS Nano 12, 4695 (2018)).

However, as noted above, the CNMs are prepared on a flat and continuous substrate. In this context, the term "continuous" means that the substrate is without pores and, therefore, impermeable to gases and fluids. Thus, the CNM needs to be transferred to a desired porous or permeable support to create a filtration device, with the disadvantages mentioned above.

In the prior art, the CNMs are transferred from an initial, continuous substrate to a porous support. This transfer method is taught, for example, in European Patent Nr. EP 2 144 711 B1. It is, however, extremely challenging to transfer nanometre-thin CNMs without producing defects in the CNMs. The transfer process is therefore not suitable for a scaled-up mass production.

The creation of pores in an atomically thin graphene layer is described, for example, in Madauß et al., Nanoscale, 9, 10487 (2017), Stoltenberg et al., U.S. Pat. No. 9,505,192 B2, and CN 103895278 B, which teach the manufacture of composite membranes comprising a transferred large-area single layer of graphene supported by a polymer foil. The composite membrane is then bombarded with heavy ions to create latent pores in the polymer foil and nanopores in the graphene.

The term latent pore in a polymer material (also termed "latent tracks" as in Apel, Radiation Measurements 34, 559 (2001) or in Oganessian et al., Nuclear Instruments and Methods in Physics Research B208, 166 (2003)) denotes a cylindrical volume traversing the polymer material with a typical diameter of a few nanometres, in which bonds in the polymer material are broken due to the bombardment of the polymer material with energetic particles. This makes the material with the broken bonds in the latent pore much more sensitive against chemical etching. The polymer material is subsequently etched to create open pores in the polymer material at the positions of the latent pores.

The fabrication is based on ion-track nanotechnology with swift heavy ions directly creating pores in both of the layers—nano-sized pores in the graphene lattice of the graphene layer and latent pores in the polymer foil. The subsequent chemical etching converts the latent pores in the polymer foil into the open pores, while the corresponding, perfectly aligned nano-sized pores in the graphene layer remain unaffected by the chemical etching. The polymer foil used in the Madauß publication is polyethylene terephthalate (PET). U.S. Pat. No. 9,505,192 B2 suggests that other polymer foils can be used.

U.S. Pat. No. 9,505,192 B2 teaches a further step in which the graphene layer is subsequently bombarded with further ions to create further pores in the graphene layer, which will not be perfectly aligned to the open pores in the polymer foil. It is to be noted that U.S. Pat. No. 9,505,192 B2 suggests that other atomically-thin layers can be used and suggests a number of examples, such as graphene, few layer graphene, molybdenum disulfide, boron nitride, hexagonal boron nitride, niobium diselenide, silicene, and germanene. These are crystalline materials with a lattice structure that is partially destroyed by the heavy-ion bombardment to create the nano-sized pores.

However, it is also known, that such nano-sized pores in graphene are often not stable and undergo "healing" processes as described in Zan et. al, Nano Letters 12, 3936

(2012) or in Zakharchenko et al., Carbon 80, 12 (2014). This could lead to a complete loss of nano-sized pores in the graphene sheet.

S. C. O'Hern et al., Nano Letters 15, 3524 (2015) describes a transfer of graphene onto track-etched supports. This prior art publication teaches a multiscale leakage-sealing process using atomic layer deposition of hafnia (hafnium IV oxide) to seal nanometre-scale defects and interfacial polymerisation to seal larger defects. The method described exploits the nonpolar nature and impermeability of pristine graphene to selectively block defects, resulting in a centimetre-scale membrane that can separate two fluid reservoirs by an atomically thin layer of graphene. The authors found that, after introducing subnanometre (nano-sized) pores in the graphene, the membrane exhibited rejection of multivalent ions and small molecules and water flux consistent with prior molecular dynamics simulations.

Another example of a porous substrate is taught in Eck et al., Adv. Mater. 17, 2583 (2005) and in Beyer et al., J. Vac. Sci. Technol. B 28, C6D5 (2010), chapter III.A. which teaches a continuous substrate of a Si wafer with latent pores (termed "windows") coated by a Si-nitride layer. The carbon nanomembranes of the Eck et al. and the Beyer et al. publications are prepared on the Si nitride layer. Subsequently, the latent pores are etched into the open pores using hydrofluoric acid to etch the Si nitride layer covering the windows to yield free-standing CNMs spanned over the open pores (i.e. windows in the Si wafer). A similar method can be used to produce free-standing CNMs for use in a Nano-microphone or pressure sensor (see, for example, Golzhauser in EP 2 032 501 B1).

JP H0360713 describes a polymer membrane, which was bombarded with high energy ions forming latent pores, which were then etched into open pores with a diameter of 10 μm or less. The polymer membrane of JP '713 is then again irradiated with high energy ions in order to carbonize the polymer membrane to make it more heat and chemically resistant. The polymer membrane of JP '713 does not comprise a CNM with intrinsic nano-sized pores.

SUMMARY OF THE INVENTION

There is a need to create an improved manufacturing process for the preparation of a porous device with a layer of the CNM.

The method involves the direct preparation of the CNMs on a perforable (latent porous) substrate (substrate with latent pores). These substrates are polymeric substrate with latent pores from tracks formed by bombardment with energetic particles, for example ions. Suitable polymers include, but are not limited to, polyethylene terephthalate (PET), polycarbonate, polyester, polyimide, polypropylene, polyvinylidene fluoride or poly methyl methacrylate. In one aspect, the polymer contains an aromatic backbone.

The method enables creation of a free-standing carbon-nanomembrane on a porous support without any transfer step. The porous support is a flat and continuous base material with latent pores as suitable substrate for manufacture of the carbon nanomembranes. Unlike to the creation of pores in both the graphene layer and the substrate known in the art, the porous device of this document will have many intrinsic nano-sized pores in the CNM layer compared to a limited number of pores in the porous substrate. The ion bombardment of the graphene layer on the other hand creates a single pore in the graphene layer matching with one pore in the substrate.

In one aspect of the invention, the latent pores in the substrate are developed to create open pores in the substrate.

The method has the advantage that it enables the tuneable density of the pores in the base material.

The base material is mechanically stable and is suitable for easy handling.

The method for manufacturing the porous device comprises a step of creating a carbon nanomembrane on a top surface of a base material having latent pores, followed by etching the latent pores in the base material to form the open pores. The latent pores in the base material are created by bombardment with energetic particles, for example ions. The bombardment can happen before creation of the carbon nanomembrane on the top surface of the base material or after the creation of the carbon nanomembrane.

The carbon nanomembrane comprises laterally cross-linked aromatic compounds. These aromatic compounds can be selected from the group consisting of phenyl-containing compounds, and are, in one aspect of the invention, at least one of a phenyl, biphenyl, terphenyl or quaterphenyl moiety.

The base material is a polymer, such as but not limited to one of a polyethylene terephthalate, polycarbonate, polyester, polyimide, polypropylene, polyvinylidene fluoride or poly methyl methacrylate.

In a further aspect of the method, a buffer layer is provided on the top surface of the base material prior to creating the carbon nanomembrane on the buffer layer.

The method results in a porous device comprising a base material with a plurality of open pores created from latent pores and a carbon nanomembrane on a top surface of the base material.

DETAILED DESCRIPTION OF THE INVENTION

Figure 1:
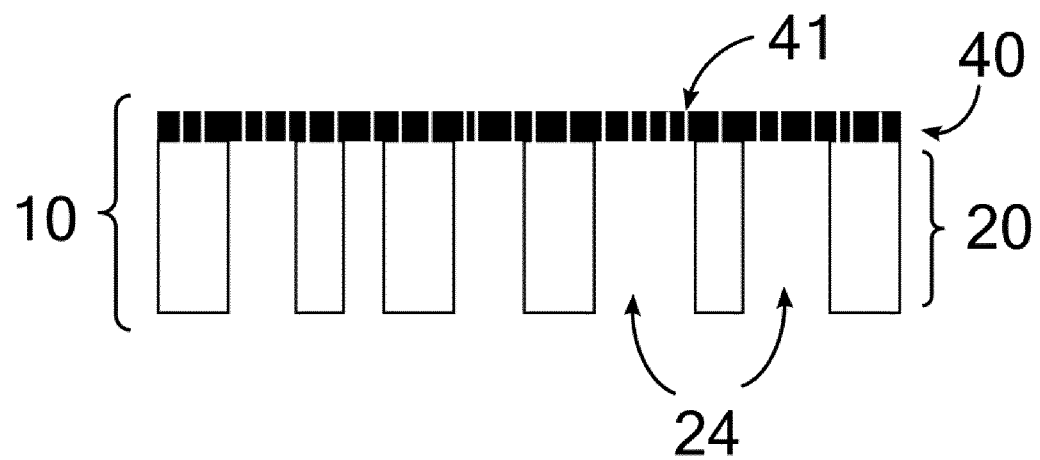
FIG. 1 shows an overview of a porous device created using the teachings of this document.
Figure 2:
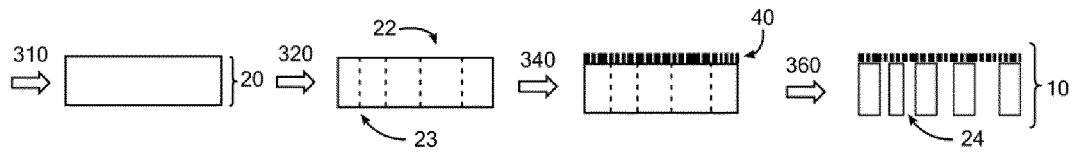
FIG. 2 shows flow diagrams illustrating the methods of manufacture.
Figure 2:
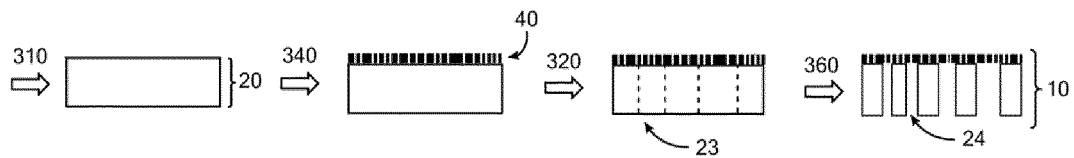
Figure 2:
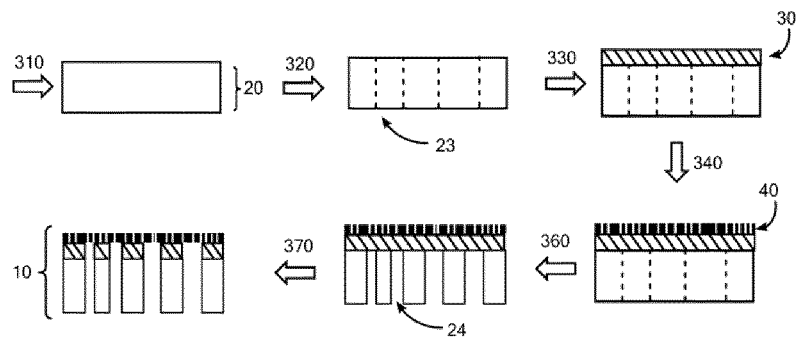
Figure 2:
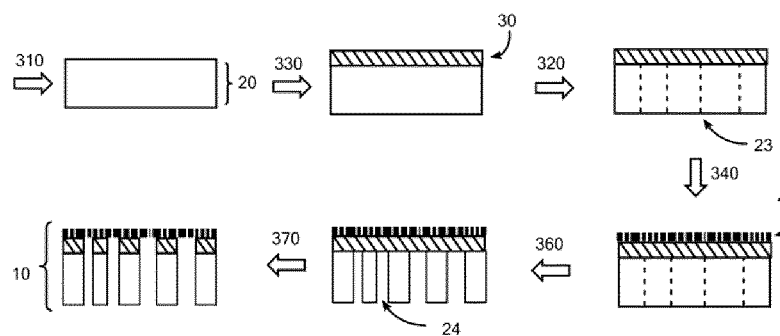
Figure 2:
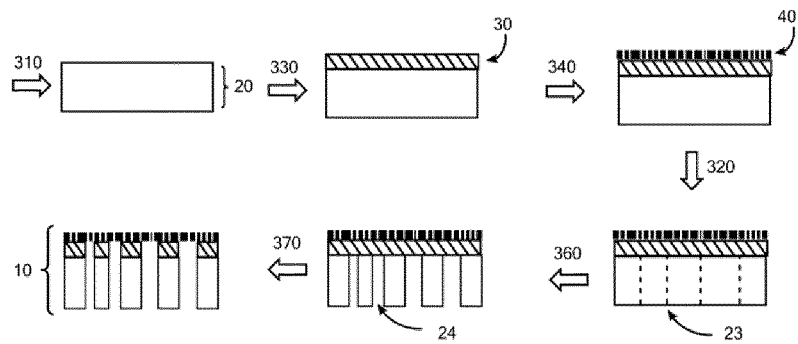

FIG. 1 shows an overview of a porous device 10 created by the method of this document and FIG. 2 shows an outline of the methods of manufacture.

The porous device 10 comprises a base material 20 used as a substrate. The base material 20 is obtained in a first step 310. The base material 20 is an organic polymer with a thickness of between 5-100 µm. The base material 20 may be covered in step 330 with a thin buffer layer 30 having a thickness between 5 and 50 nm, but this buffer layer 30 is not necessarily required. Examples of materials for the buffer layer include, but are not limited to, gold, silver, titanium, zirconium, vanadium, chromium, manganese, cobalt, tungsten, molybdenum, platinum, aluminium, iron, steel, copper, nickel, silicon, germanium, indium phosphide, gallium arsenide and oxides, nitrides or alloys or mixtures thereof, indium-tin oxide, sapphire, silicate or borate glasses.

A carbon nanomembrane (CNM) 40 having intrinsic pores 41 is prepared on the base material 20 in step 340 or on the optional buffer layer 30.

The base material 20 has latent pores 23 created therein by bombardment with energetic particles (step 320). The particles may be in the form of electrons, ions, neutrons, ion clusters, fission fragments and the like and are sufficiently energetic to traverse the base material 20. In one embodiment the particles are ions. This bombardment (step 320) can be carried out either before or after the steps of deposition of the buffer layer 30 (step 330) and/or the preparation of the CNM 40 (step 340). The bombardment leads to formation of so-called latent pores 23 (or tracks) in the base material 20.

The correct energy of the energetic particles to create latent pores 23 can be determined easily by calculation and/or experiment. The energy depends on the species of the energetic particles as well as on the type and thickness of the base material 20 (as described, for example in W. Starosta, Radiation use in producing track-etched membranes, in Applications of ionizing radiation in materials processing, Vol. 2, ed. by Y. Sun and A. G. Chmielewski, Institute of Nuclear Chemistry and Technology, Warszawa 2017 (ISBN 978-83-946412-0-7).

The interaction of energetic particles in matter, i.e. the energy loss per unit length, is required for the calculation and can be obtained from experimental data. For the creation of continuous etchable latent pores in polymer films, the energy deposition per unit length should be higher than some threshold estimated at 720-900 eV/nm for polycarbonate, polyimide and polyethylene terephthalate (Trautmann et al., Nucl. Instrum. Meth. Phys. Res. B, 116, 429 (1996)). It is typically >1 MeV/micron thickness, but this value is not limiting of the invention. More specifically the energy required is >5 MeV/micron. For the case of the Xe ion with a specific energy of 3 MeV/u, the linear energy deposition reaches the value of 120 eV/nm and the range of the nearly uniform linear energy loss is sufficiently long, reaching about 20 µm in polyethylene terephthalate (as know from the above-cited W. Starosta publication).

The density of the bombardment reflects the density of the latent pores 23.

Chemical etching in step 360 converts the latent pores 23 in the base material 20 into open pores 24 without affecting the structure of the CNM 40.

Optionally, a step of etching of the buffer layer 30 using a different etching agent (step 370) can be carried out without affecting the CNM 40.

Conditions of etching (species and concentration of etching agent, temperature, and duration) control the diameter of the open pores 24.

Heavy ion bombarded polymer sheets are commercially available in square-meter sizes and larger, e.g from Oxyphen AG, Wetzikon, Switzerland.

EXAMPLES

Ion bombarded (IB) polyethylene terephthalate (PET) (obtained from Oxyphen AG, Wetzikon, Switzerland) sheets were used as the base material 20 (also called substrate) for preparation of the CNM 40. These IB-PET sheets exhibit latent pores 23 which means that the ion beam has corrupted the polymer structure a couple of nanometres around its path. This makes the polymer along the ion path much more sensitive against chemical etching (e.g by an NaOH solution). Therefore, the latent pores 23 can be etched into open pores 24.

The buffer layer 30 is applied initially on the IB-PET polymer base material 20 (step 330) by sputtering of aluminium. Next, a monolayer of aromatic biphenyl or terphenyl molecules is formed (step 340) on the buffer layer 30 (in this case aluminium). These biphenyl or terphenyl molecules carry a specific anchor group for the material in the buffer layer 30 (e.g phosphonic acid for aluminium or thiols for gold). The biphenyl or terphenyl monolayers are converted into the CNM 40 by crosslinking, e.g. by irradiation with low-energy electrons (at a dose density of 50 mC/cm$^2$ at 100 eV). The monolayer formation as well as the carbon nanomembrane crosslinking was verified by XPS. The formation of the CNM on the buffer layer on the PET film is analogue to steps of the method described in WO 2017/072272 A1.

In a second example, two routes of directly preparing the CNM 40 (step 340) on the IB-PET base material 20 were developed without the need of the intermediate buffer layer 30. In a first route, the CNM-building aromatic molecules were applied directly on a top surface of the IB-PET base material 20 by spin-coating, dip-coating, spray-coating, slot die casting or just immersion. The second route requires no external molecule and exploits the property that the PET base material 20 itself is a polymer with an aromatic backbone. When irradiated with low energy electrons (250 eV, 50 mC/cm$^2$), the outer 1-20 nm are cross-linked into a carbon nanomembrane 40 which is stable against chemical etching.

In the final step (step 360), the latent pores 23 are opened into open pores 24 by floating the IB-PET-CNM stack on 20% aqueous NaOH solution at 60-70° C. The etching time is dependent on the thickness of the IB-PET foil and the desired diameter of the open pores 24. Although the CNM 40 is just nanometres thin in thickness, the CNM 40 is found to be substantially stable against the etching conditions. It will be noted that the specific etching conditions strongly depend on the used polymers. Polycarbonates and PET need basic etching conditions as mentioned above, ion bombarded fluoro-containing polymers, polypropylene (PP) and poly methyl methacrylate (PMMA) are prone to permanganates and polyimides are sensitive to hypochlorides.

Optionally, a sacrificial protecting layer of e.g. PMMA is applied on the CNM 40 during the etching step (step 360) which can be removed easily with acetone afterwards.

Figure 3:
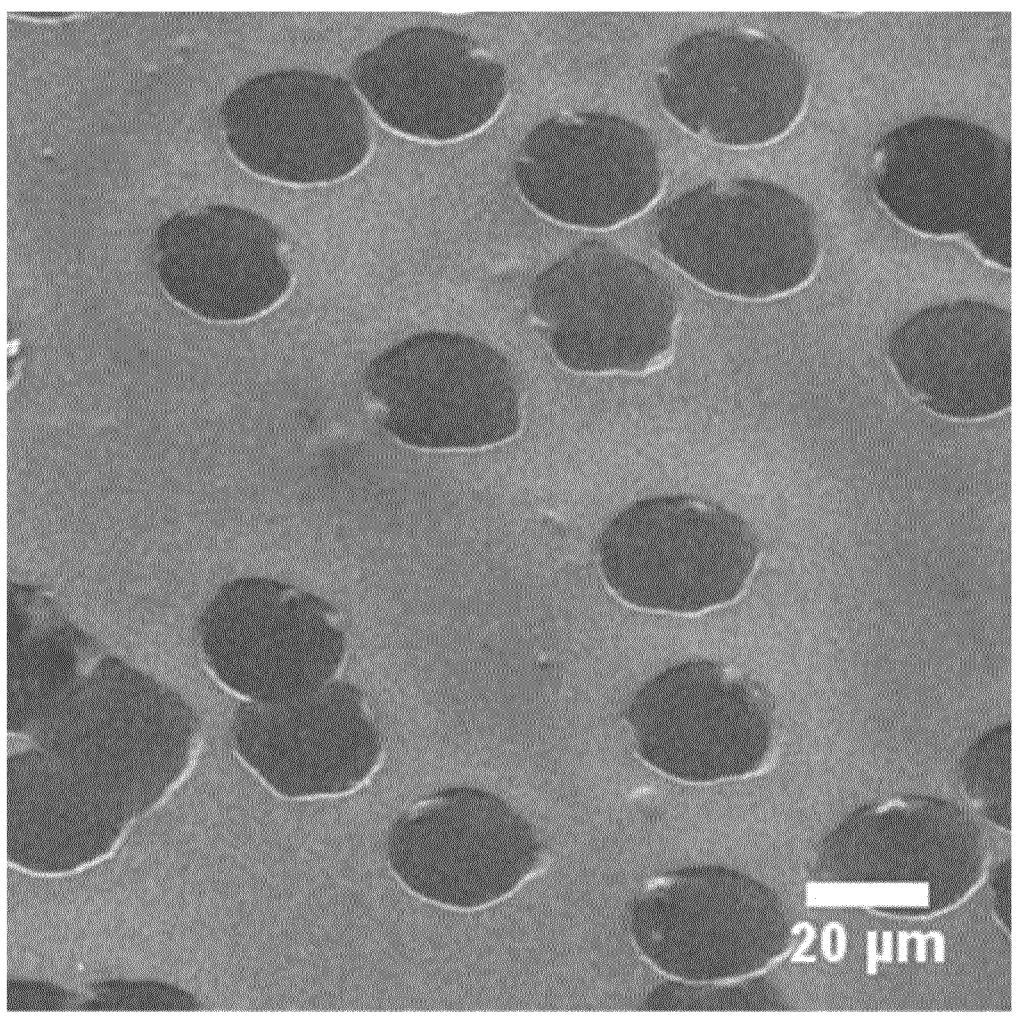
FIG. 3 shows a helium ion micrograph of the surface of the device illustrating the carbon nanomembrane over the open pores in the base material.

The freestanding CNM 40 spanned over the accumulation of the etched open pores 24 as was demonstrated by optical microscopy, helium ion microscopy, and functional (permeation) tests. FIG. 3 shows a helium ion micrograph of the surface of the CNM 40 indicating the open pores 24 covered by the intact layer of the CNMs 40. In this example the open pores 24 in the base material have a diameter of about 20 µm.

Figure 4:
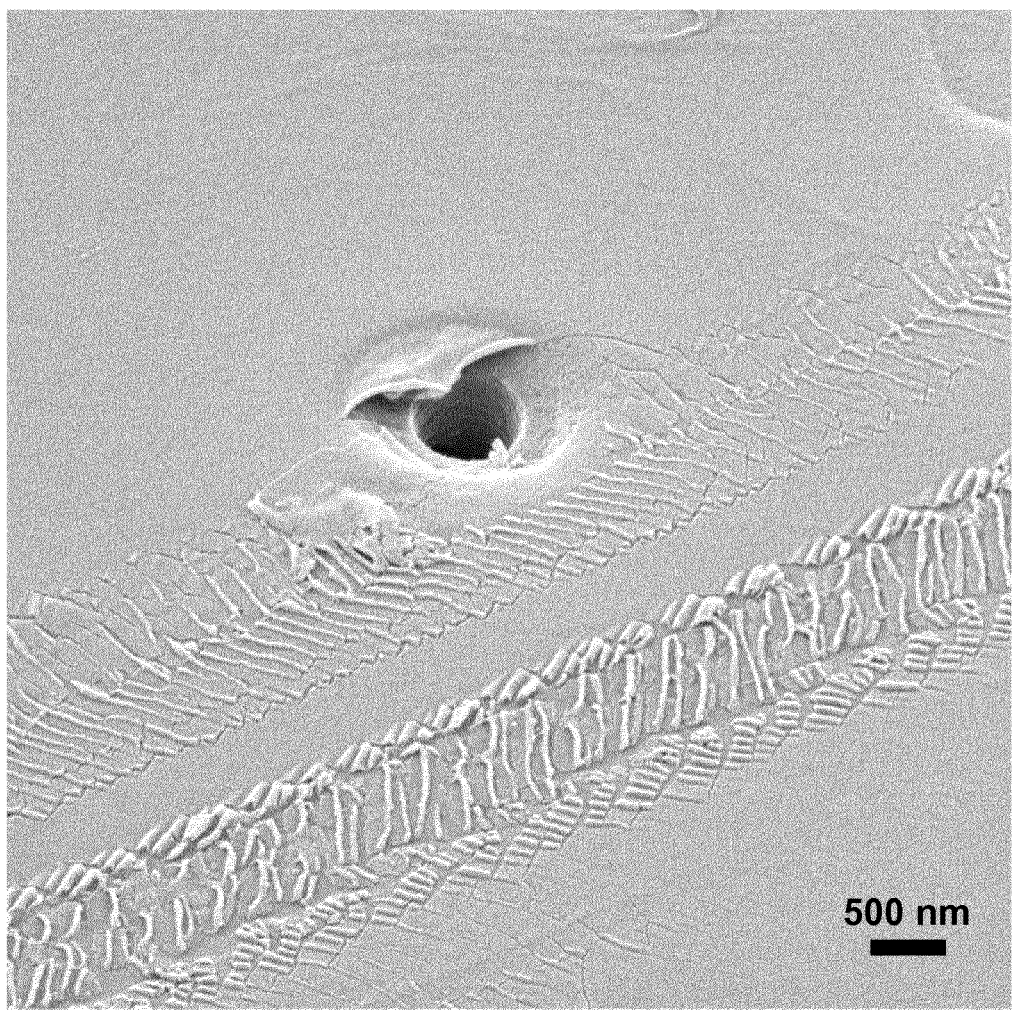
FIG. 4 shows a helium ion micrograph with a mechanically damaged carbon nanomembrane over an open pore in the base material.

FIG. 4 shows a helium ion micrograph of a mechanically damaged CNM 40 and base material 20 (scratch with a tweezer) in order to show an open pore 24. In this example the open pores 24 in the base material have a diameter of about 0.5 µm.

The water permeance of a CNM was determined by the cup test method as described by Yang et al., ACS Nano 12, 4695 (2018). In order to do so, a CNM with a thickness of about 20 nm, which was prepared by directly crosslinking the surface of a PET foil, was released from the PET foil and transferred by conventional methods (according to EP 2 144 711 B1) to a silicon nitride membrane with a hole of 15 μm diameter. The permeance of the CNM was measured to be about 60 l/(m² h bar).

In a second experiment, a CNM 40 was prepared on an IB-PET substrate under similar conditions. Subsequently, the latent pores 23 in the IB-PET were etched to open pores 24 yielding a porous device 10 with a CNM 40 covering the open pores 24 in the PET base material 20. The ratio of the area of the open pores 24 to the total membrane area (porous device 10) was about 3%. The water permeance of the whole membrane (porous device 10) was determined in a dead-end filtration setup to be about 1 l/(m² h bar). Taking the ratio of the area of the open pores 24 to the whole membrane area (porous device 10) into account and assuming an uninhibited flow of water through the open pores 24, this value corresponds to a water permeance of about 30 l/(m² h bar) of the CNM 40 alone. This value is in good accordance to the permeance of a similar CNM measured by the cup test method as described above.

Figure 5:
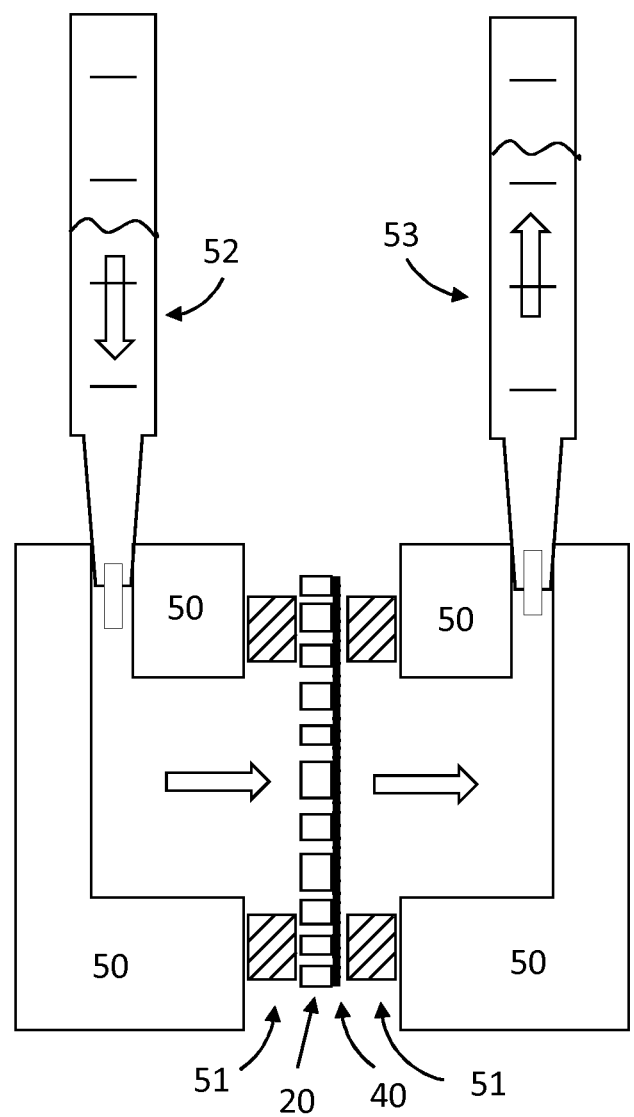
FIG. 5 shows a simple osmosis experiment used to demonstrate the high water permeance combined with a high rejection of almost all other substances using a porous device as described in this application.

A simple osmosis experiment as shown in FIG. 5 was used to demonstrate the high water permeance of the CNM 40 combined with a high rejection of almost all other substances using a porous device 10 as described in this application. The CNM 40 is prepared directly on the PET base material 20 with latent pores 22 (step 340) followed by opening the pores (step 360) The porous device 10 is clamped into an osmotic chamber which consists of two moieties (50) with 5 ml volume each using two rubber sealings 51. The porous device 10 separates the two moieties. Each moiety of the osmotic cell has an opening to be filled with liquids: The one side "feed" 52 is filled with pure water while the other side "draw" 53 is filled. with for example a 1 M NaCl solution. Due to the osmotic pressure caused by the concentration difference in both moieties water permeates through the porous device 10 from the feed 52 to the draw 53 and the water level increases in the draw 53 while decreasing in the feed 52, accordingly.

Figure 6:
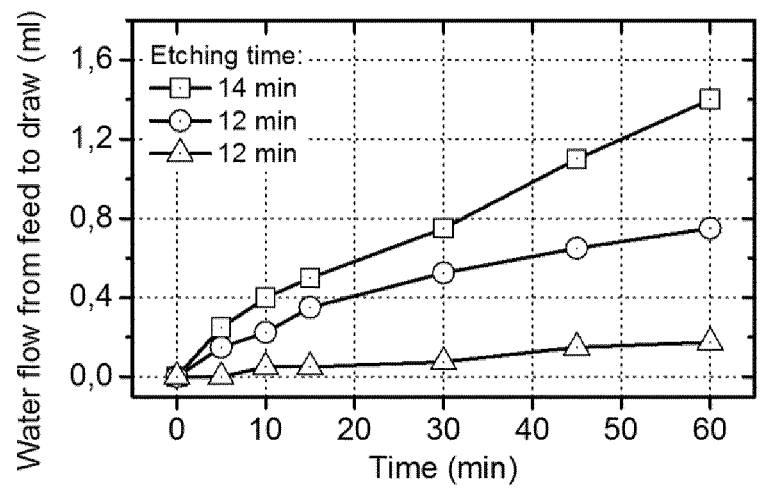
FIG. 6. shows a plot of the water flow vs. the time for three porous devices, which were prepared by different etching times, characterised with the experiment shown in FIG. 5.

This water flow is plotted against the time in FIG. 6 for three porous devices 10, which were prepared by different etching times. It is obvious that longer etching times lead to larger open pores 24 in the base material 20 and a higher water flux. Note, that only a nearly intact CNM 40 exhibits water flow due to osmosis, because a reverse salt flow through defects like ruptures would level out the concentration gradient between the feed 52 and the draw 53.

Figure 7:
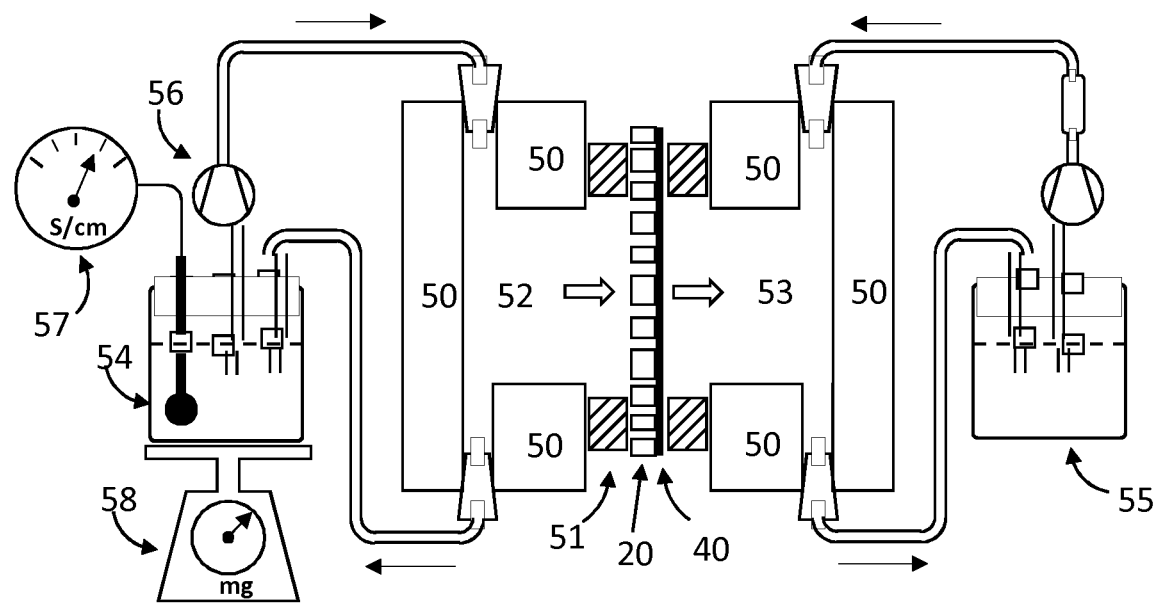
FIG. 7 shows an experimental setup to characterise the water permeance and the salt rejection of a porous device as described in this application.

A more sophisticated setup to characterise the water permeance and the salt rejection of the porous device 10 is shown in FIG. 7. The feed 52 and the draw 53 circulate continuously from reservoirs 54 and 55 through the flow cell 50 and back to the reservoirs 54 and 55. The water permeation through the porous device 10 can be determined quantitatively by measuring the mass loss of the feed 52 with a balance 58. At the same time, the undesired reverse salt flow from the draw 53 to the feed 52 is recorded with a conductivity meter 57. Note that this method is very sensitive and allows the detection of tiny amounts of salt in the feed 52. A specific calibration curve finally converts the conductivity into the salt concentration.

Figure 8:
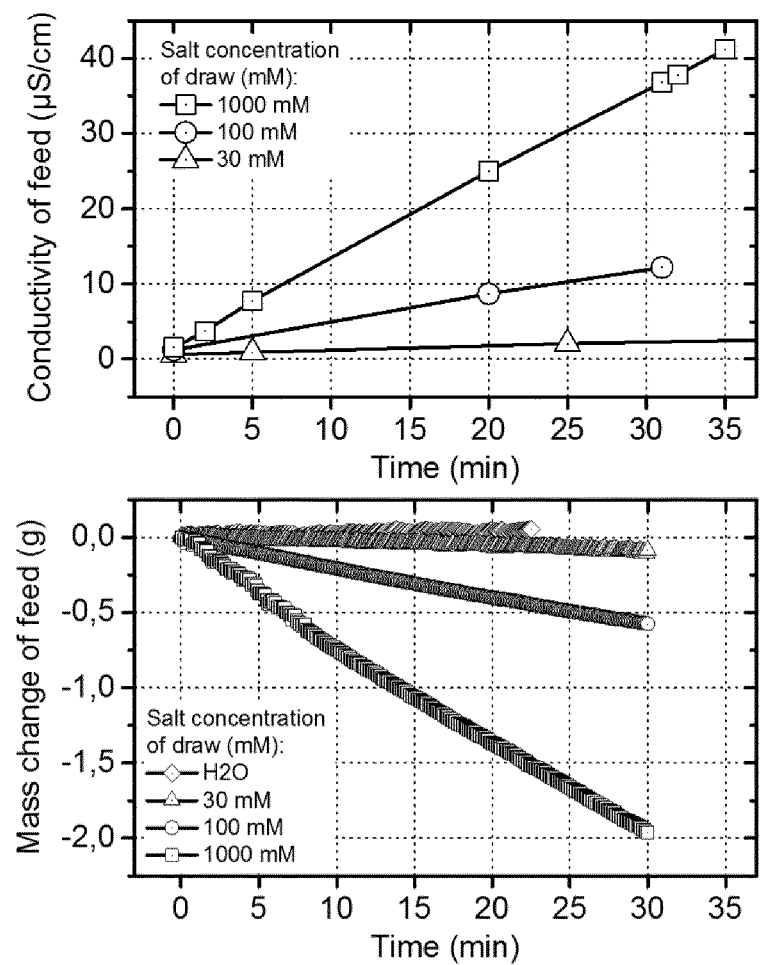
FIG. 8 shows plots of the water flow and the reverse salt flow through a porous device characterised with the setup shown in FIG. 7.

By this setup the porous device 10 was fully characterised: at a concentration of the draw 53 of 1 M NaCl, the water flow through the porous device 10 due to the osmotic pressure is 15 l/h/m² while the undesired reverse salt flow is just 14 g/h/m² (or 0.9 g salt per 1 l water). This salt rejection performance becomes even higher when using lower draw concentrations (at the expense of water flow) (see FIG. 8).

Applications

The porous device 10 can be used as a filtration device.

The porous device 10 can be used for concentration of watery solutions using a similar process, called "forward osmosis", as shown in FIG. 7. by using, for example, a highly concentrated salt solution like sea water as the draw 53 to concentrate the lesser concentrated watery solution in the feed 52.

ACKNOWLEDGEMENT OF GRANT SUPPORT

The work in this application was supported by the German Federal Ministry for Education and Research under research grant 02WIL1453C.

The invention claimed is:

1. A method for manufacturing a porous device comprising:
   creating a carbon nanomembrane on a top surface of a base material having latent pores, wherein the carbon nanomembrane comprises laterally cross-linked aromatic compounds; and
   etching the latent pores in the base material to form open pores.

2. The method of claim 1, wherein the latent pores in the base material are created by bombarding the base material with energetic particles.

3. The method of claim 2, wherein the bombarding the base material with the energetic particles is carried out prior to the creating of the carbon nanomembrane.

4. The method of claim 1, wherein the aromatic compounds are selected from the group consisting of phenyl-containing compounds.

5. The method of claim 1, wherein the aromatic compounds are at least one of a phenyl, biphenyl, terphenyl or quaterphenyl moiety.

6. The method of claim 1, wherein the base material is a polymer.

7. The method of claim 6, wherein the base material is one of a polyethylene terephthalate, polycarbonate, polyester, polyimide, polypropylene, polyvinylidene fluoride or poly methyl methacrylate.

8. The method of claim 1, further comprising depositing a buffer layer on the top surface of the base material prior to creating the carbon nanomembrane on the buffer layer.

* * * * *